(12) United States Patent
Bean (10) Patent No.: US 9,834,133 B2
(45) Date of Patent: Dec. 5, 2017

(54) WIRELESS LINK AND A VEHICLE ELECTRICAL SYSTEM USING THE SAME

(71) Applicant: R.A. Phillips Industries, Inc., Santa Fe Springs, CA (US)

(72) Inventor: Adam Bean, Hacienda Heights, CA (US)

(73) Assignee: R. A. PHILLIPS INDUSTRIES, INC., Santa Fe Springs, CA (US)

( * ) Notice: Subject to any disclaimer, the term of this patent is extended or adjusted under 35 U.S.C. 154(b) by 12 days.

(21) Appl. No.: 14/809,145

(22) Filed: Jul. 24, 2015

(65) Prior Publication Data

US 2016/0023587 A1    Jan. 28, 2016

Related U.S. Application Data

(60) Provisional application No. 62/028,733, filed on Jul. 24, 2014.

(51) Int. Cl.
*B60Q 1/00* (2006.01)
*B60Q 1/30* (2006.01)
*B60R 16/03* (2006.01)

(52) U.S. Cl.
CPC ........... *B60Q 1/0088* (2013.01); *B60Q 1/305* (2013.01); *B60R 16/03* (2013.01); *B60Q 2900/30* (2013.01)

(58) Field of Classification Search
CPC ........ B60Q 1/0088; B60Q 1/305; B60R 16/03
See application file for complete search history.

(56) References Cited

U.S. PATENT DOCUMENTS

| | | | |
|---|---|---|---|
| 6,222,443 B1* | 4/2001 | Beeson | B60D 1/065 307/10.1 |
| 7,498,687 B2* | 3/2009 | Kinsey | H02J 1/14 307/10.1 |
| 7,683,585 B1* | 3/2010 | Johnson | H02J 7/1423 320/104 |
| 2005/0062590 A1* | 3/2005 | Lang | B60D 1/62 340/431 |
| 2009/0219148 A1* | 9/2009 | Thomas | B60R 16/0315 340/431 |
| 2012/0191270 A1* | 7/2012 | Floyd | B60Q 1/305 701/2 |

* cited by examiner

*Primary Examiner* — Andrew Bee
(74) *Attorney, Agent, or Firm* — Lewis Roca Rothgerber Christie LLP (57) ABSTRACT

Provided is an electrical communication link between a tractor and a trailer, the trailer comprising one or more auxiliary electrical devices, the electrical communication link including a first transceiver coupled to the tractor and configured to receive a first signal from the tractor and to wirelessly transmit a control signal corresponding to the first signal, a second transceiver coupled to the trailer and configured to wirelessly receive the control signal and to transmit a second signal corresponding to the control signal to the one or more auxiliary devices.

13 Claims, 4 Drawing Sheets

WIRELESS LINK AND A VEHICLE ELECTRICAL SYSTEM USING THE SAME

CROSS-REFERENCE TO RELATED APPLICATIONS

This application claims priority to and the benefit of U.S. Provisional Application No. 62/028,733, filed Jul. 24, 2014, the content of which is incorporated herein by reference.

BACKGROUND

The present invention relates to the field of lighting systems for trucks, trailers, and other motor vehicles.

Trailers that are hitched to, and towed behind, tractors, trucks, or other vehicles have electrical systems that typically include stop lights, turn signals, brake lights, exterior lights, interior lights, and/or other auxiliary electrical devices. These devices are often operated using controls at the interior of the vehicle towing the trailer. This may be accomplished electrically by coupling one or more electrical wires from the trailer to corresponding wires of the vehicle used to tow the trailer (e.g., via a plug and socket, such as a 7-way connector). Accordingly, by operating controls of the vehicle (e.g., a brake pedal, a turn signal switch, or another type of switch), a signal may be sent via one or more of the wires of the vehicle through the electrical coupling, and to the corresponding wire(s) of the trailer, thereby enabling the vehicle operator to effectively control circuits or devices of the trailer.

A persistent problem affecting the trucking/tractor trailer industry is the corrosion of electrical wires, electrical connections, or electrical junctions used to create the electrical connection between the tractors and trailers. Corrosion may be caused by, for example, salt and de-icing agents, which are used on the roads on which the tractors and trailers travel, as well as moisture or water present on the roads and in the atmosphere. When these materials reach exposed electrical wiring or electrical connections, the materials can chemically react with the metals of the wires and connections to create rust or corrosion. Such rust and corrosion can lead to power being inconsistently or inefficiently transmitted to the lights, turn indicators, brake signals, etc., and can even lead to a total loss of power to these circuits.

Inconsistent power transmission through the electrical circuits due to bad electrical connections or due to corrosion can cause, for example, a trailer's exterior lighting system to flicker or to fail to turn on. The rust or corrosion may create a barrier at a surface of the electrical wires, or may cause the surface area of the electrical wires or the corresponding connection (e.g., to the junction boxes) to be corroded away, thereby causing poor contact due to wires/pins failing to make surface contact with each other.

A driver/operator of a tractor towing a trailer may not be aware of deterioration of the truck or trailer electrical systems because the operator does not have a direct line-of-sight to many of the trailer's electrical devices (such as a trailer's lighting fixtures) from the cab of the tractor. This can create safety hazards due to inconsistent or non-existent power transmission to components of the trailer. Additionally, the operator of the truck may potentially receive a traffic citation for improperly working equipment.

What is desired is a system for enabling electronic communication between the tractor and the trailer that is less susceptible to the effects of corrosion and other natural hazards adversely affecting the wired electrical connections between the tractor and trailer.

SUMMARY

Aspects of some embodiments of the present invention are directed toward utilizing a wireless connection to communicate electrical signals between the trailer and the tractor/truck in order to provide a more robust and secure connection between the trailer and tractor.

According to some embodiments of the present invention, there is provided an electrical communication link between a tractor and a trailer, the trailer comprising one or more auxiliary electrical devices, the electrical communication link including: a first transceiver coupled to the tractor and configured to receive a first signal from the tractor and to wirelessly transmit a control signal corresponding to the first signal; a second transceiver coupled to the trailer and configured to wirelessly receive the control signal and to transmit a second signal corresponding to the control signal to the one or more auxiliary devices.

In an embodiment, the second transceiver is further configured to receive a third signal indicative of a state of the one or more auxiliary devices and to wirelessly transmit a feedback signal corresponding to the first signal, and the first transceiver is further configured to wirelessly receive the feedback signal and to transmit a fourth signal corresponding to the feedback signal to the tractor.

In an embodiment, the feedback signal includes diagnostic data indicative of a fault condition in the one or more auxiliary devices.

In an embodiment, the first transceiver is further configured to couple to a multi-pin socket of a tractor junction box, and the second transceiver is further configured to couple to a multi-pin socket of a trailer junction box.

In an embodiment, the one or more auxiliary devices include at least one of a stop light, a turn signal, a brake light, a trailer exterior light, a trailer interior light, and an anti-lock braking system.

In an embodiment, each of the second transceiver and the one or more auxiliary devices are configured to receive electrical power from a battery at the trailer.

In an embodiment, the first and second transceivers are coupled to junction boxes at the tractor and trailers, respectively.

In an embodiment, the first and second transceivers are configured to operate in conjunction with an electrical cable coupling the tractor and the trailer.

In an embodiment, the electrical communication link further includes a control circuit configured to determine when to power the second transceiver from a battery at the trailer, and when to power the second transceiver from the tractor through the electrical cable.

According to some embodiments of the present invention, there is provided an electrical system for communicating signals between a tractor and a trailer, the electrical system including: a first transceiver coupled to the tractor and configured to receive a first signal from the tractor and to wirelessly transmit a control signal corresponding to the first signal; a second transceiver coupled to the trailer and configured to wirelessly receive the control signal and to transmit a second signal corresponding to the control signal to one or more auxiliary devices; a battery coupled to the trailer and configured to power the second transceiver, a controller coupled between the second transceiver and the one or more auxiliary devices configured to activate the one or more auxiliary devices based on the second signal.

In an embodiment, the second transceiver is further configured to receive a third signal indicative of a state of the one or more auxiliary devices from the controller and to wirelessly transmit a feedback signal corresponding to the first signal, and the first transceiver is further configured to wirelessly receive the feedback signal and to transmit a fourth signal corresponding to the feedback signal to the tractor.

In an embodiment, the controller includes a switching network configured to couple the one or more auxiliary devices to the battery based on the second signal.

In an embodiment, the controller includes a sensor configured to monitor a voltage of the battery.

In an embodiment, the controller is configured to generate a fault signal when the voltage of the battery is below a threshold.

In an embodiment, the first and second transceivers are configured to transmit the fault signal to the tractor.

BRIEF DESCRIPTION OF THE DRAWINGS

The accompanying drawings, together with the specification, illustrate exemplary embodiments of the present invention, and, together with the description, serve to explain aspects of embodiments of the present invention. In the drawings, like reference numerals are used throughout the figures to reference like features and components. The figures are not necessarily drawn to scale. The above and other features and aspects of the present invention will become more apparent by the following detailed description of illustrative embodiments thereof with reference to the attached drawings, in which.

DETAILED DESCRIPTION

Aspects of some embodiments of the present invention are directed to a pair of wireless transceivers in wireless communication with one another and including a wireless transceiver integrated with the electrical system of a tractor (a tractor transceiver) and a wireless transceiver integrated with the electrical system of a trailer (trailer transceiver). The tractor transceiver may be coupled to a user interface inside the tractor allowing an operator to control auxiliary devices coupled to the electrical system in the trailer and displaying certain feedback information to the operator/driver. The trailer transceiver controls the trailer's electrical system based on the signal received from the tractor transceiver and may provide a feedback signal to the trailer transceiver indicating the state of the various auxiliary devices coupled to the trailer's electrical system. The tractor transceiver may be powered by the tractor, while the trailer transceiver may be powered by a battery (e.g., an auxiliary battery) coupled to the trailer.

Figure 1:
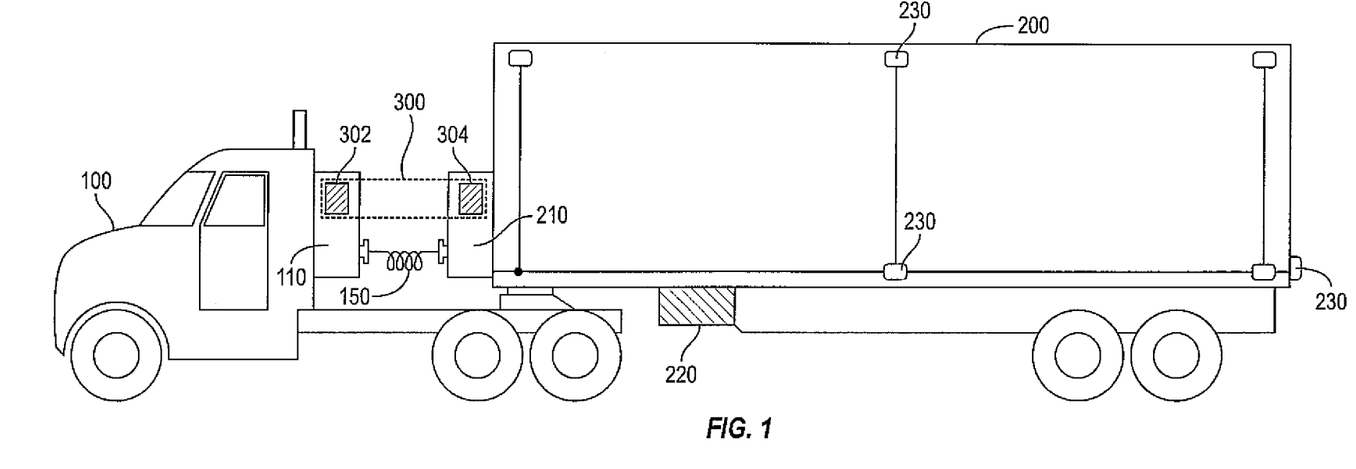
FIG. 1 is a schematic diagram of a tractor and trailer employing a wireless communication link, according to some exemplary embodiments of the present invention.

FIG. 1 is a schematic diagram of a tractor 100 and trailer 200 employing a wireless communication link 300, according to some exemplary embodiment of the present invention.

According to some embodiments of the present invention the electrical system of a tractor 100 may wirelessly communicate with the electrical system of a trailer 200 via a wireless communication link (henceforth, wireless link) 300 including a first wireless transceiver (henceforth, a tractor transceiver) 302 coupled to (e.g., integrated with) the electrical system of a tractor 100 and a second wireless transceiver (henceforth, a trailer transceiver) 304 coupled to (e.g., integrated with) the electrical system of a trailer 200. As such, according to some embodiments, the wireless link 300 may perform substantially the same function as a typical 7-way connector cable 150, that is, to facilitate the transfer of electrical signals between the electrical systems of the tractor 100 and trailer 200.

The wireless link 300 may employ a short-range or midrange wireless communication protocol such as bluetooth, infrared data association (IrDA), wireless personal area networks (WPAN), wireless local area networks (WLAN) such as 802.11a/b/g/n, and/or the like. The signal transmission through the wireless link 300 may be encoded/encrypted to prevent tampering with the wireless signal by an outside entity (such as a hacker) or to make the wireless connection less susceptible to electrical noise produced by the electrical circuits of the tractor/trailer 100/200 and/or the outside environment.

In some embodiments, the wireless link 300 acts as a primary link between the tractor 100 and trailer 200, while a 7-way connector cable (e.g., 7-way cord) 150 functions as a secondary link (e.g., a back-up link) therebetween to provide suitable electrical communication when the wireless link 300 becomes faulty (e.g., when either of the tractor/trailer transceivers 302/304 break down). Other embodiments may not employ the 7-way connector 150 as a backup and rely solely on the wireless link 300.

In some embodiments, the tractor transceiver 302 is coupled to (e.g., located at or integrated with) the tractor junction box 110, and the trailer transceiver 304 is coupled to the trailer junction box 210. In some examples, the tractor transceiver 302 and the trailer transceiver 304 may be located at or integrated with the tractor junction box 110 and the trailer junction box 210, respectively. In other examples, the tractor transceiver 302 and the trailer transceiver 304 may be located at the back of the tractor 100 and the front of the trailer 200, respectively, but be external to the corresponding junction boxes 110 and 210.

In some embodiments, each of the two transceivers 302 and 304 may be configured to plug into the 7-pin sockets located at each of the tractor/trailer junction boxes 110/210, which are conventionally used to couple to the 7-way connector cable 150. However, embodiments of the present invention are not limited to junction boxes employing 7-pins and wireless link 300 may be used with junction boxes 110/210 having any suitable number of pins. For example, the wireless link 300 may be used in tandem with, or in lieu of, a cable (e.g., connector or harness) having as few as 1 pin to as many as 15 pins (or more), depending on the adopted connection standard (e.g., SAE J560 or the like).

In some embodiments, the tractor transceiver 302 may be powered by the electrical system of the tractor 100 (e.g., a tractor power supply such as the tractor battery), and the trailer transceiver 304 may be powered by a battery (e.g., an auxiliary battery) 220 housed at the trailer 200. The battery 220 may also supply power to the auxiliary devices (e.g., external electrical devices) 230 coupled to electrical system of the trailer 200. The auxiliary devices 230 may include stop lights, turn signals, brake lights, exterior lights, interior lights, an anti-lock braking system (ABS) and/or other electrical devices external to the tractor 100, which may be attached to or provided in the trailer 200.

In some embodiments, the battery 220 may be charged (e.g., recharged) by an alternate power unit (APU) such as a generator (e.g., a diesel/gas generator), photovoltaic solar panels, a mechanism for regenerative breaking, and/or the like. The battery 220 may also be charged (e.g., recharged) through an external source such as the electric grid.

Figure 2:
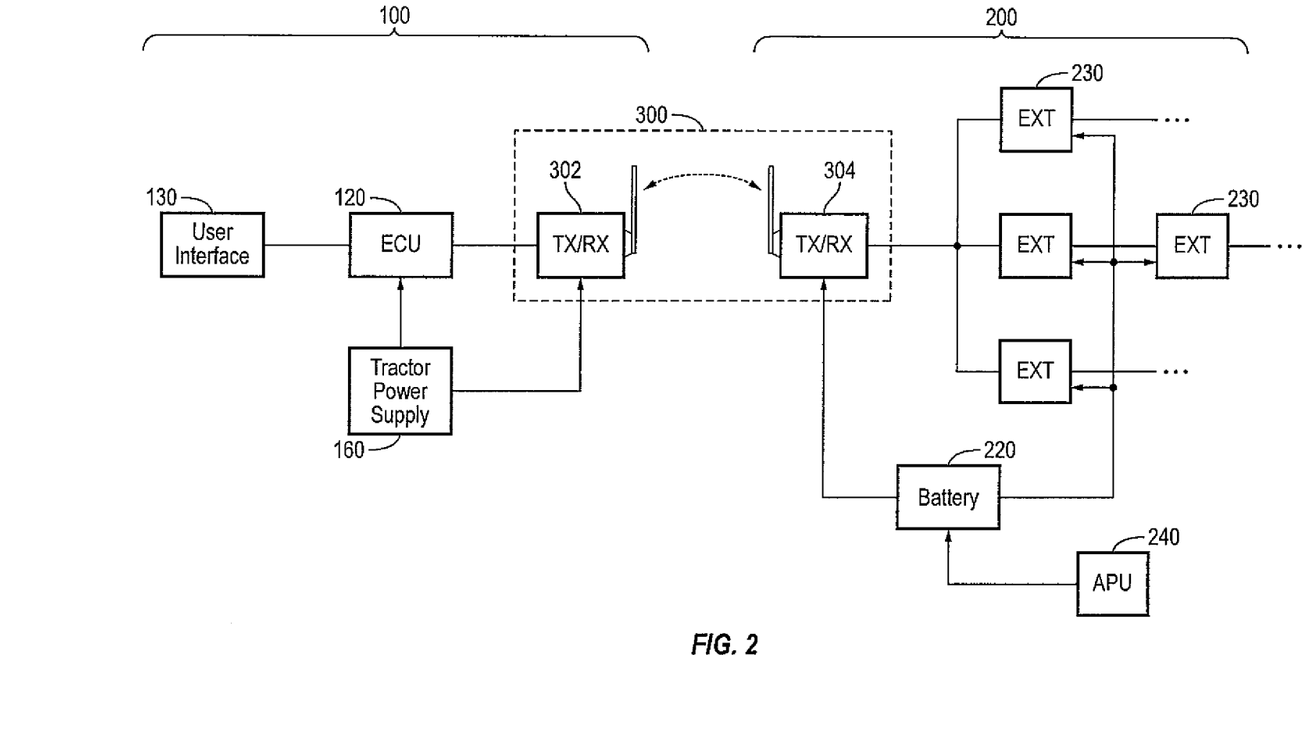
FIG. 2 is a schematic diagram of a truck's wireless communication system employing a wireless link, according to some exemplary embodiments of the present invention.

FIG. 2 is a schematic diagram of a truck's wireless communication system employing a wireless link 300, according to some exemplary embodiments of the present invention.

According to some embodiments, a wireless link 300 couples (e.g., electrically couples) the electrical system of the tractor 100 and that of the trailer 200.

In some embodiments, the electrical system of the tractor 100 includes an electronic control unit (ECU) 120 for controlling and/or monitoring the electrical systems in the tractor/trailer 100/200, a tractor transceiver 302 coupled to the ECU 120 and for transmitting signals back and forth between the ECU 120 and the electrical system of the trailer 200, and a tractor power supply 160. The tractor power supply 160 may provide electrical power to the tractor transceiver 302 and may be the primary tractor battery, an auxiliary battery, or an electrical generator in the tractor 100. The electrical system of the tractor 100 may further include a user interface console 130 coupled to the ECU 120 that permits an operator (e.g., driver) to control aspects of, and receive feedback from, the electrical system of the trailer 200.

In some embodiments, the electrical system of the trailer 200 includes a trailer transceiver 304, one or more auxiliary devices 230 coupled to the trailer transceiver 304, and a battery 220. In embodiments in which there is no physical electrical conductor providing power to the electrical system of the trailer 200 from the tractor 100, the battery 220 may serve as the power source supplying power to the trailer transceiver 304 and/or the one or more auxiliary devices 230. The electrical system of the trailer 200 may further include the alternate power unit (APU) 240 for charging/recharging the battery 220 and/or powering the one or more auxiliary devices 230. In some embodiments, the trailer 200 includes a plurality of auxiliary devices 230, which may be coupled to one another serially, in parallel, or in a hybrid formation (e.g., a formation including both serial and parallel connected devices).

In some embodiments, the electrical systems of the tractor 100 and trailer 200 may be further coupled through a cable, such as a 7-pin connector, which may supply electrical power from the tractor 100 to the trailer 200. In such embodiments, the electrical system of the tractor 100 or the trailer 200 may further include a control circuit for deciding whether to power the electrical system of the trailer 200 through the battery 220, APU 240, and/or the tractor power supply 160. For example, the control circuit may draw power from the battery 220 only when the power from tractor power supply 160 is insufficient to power the one or more auxiliary devices 230 in the trailer 200 and/or when there is a cable connection failure (e.g., cable not present).

In some embodiments, the wireless link 300 may transmit control signals from the ECU 120 to the auxiliary devices 230 to control the state of the auxiliary devices 230 (e.g., to turn them ON or OFF), or to perform diagnostic procedures to determine if any of the auxiliary devices 230 are faulty.

The wireless link 300 may also send data (e.g., diagnostic data or device state data) back to the ECU 120 for processing and/or for display on the user interface console 130. The user interface console 130 may include image content displayed on a screen and/or physical buttons, switches, and/or lights that a user can interact with, which may, for example, allow an operator to manually turn ON or OFF the auxiliary devices 230.

Figure 3:
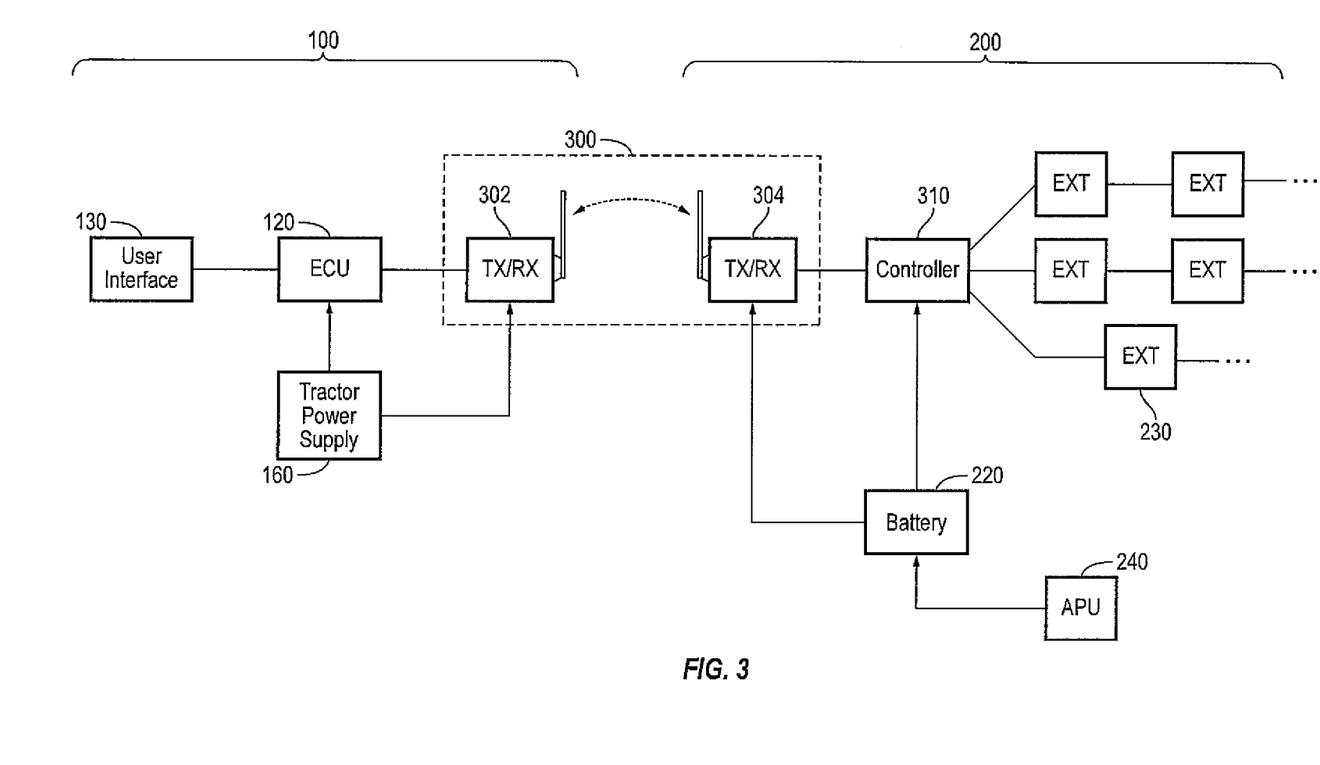
FIG. 3 is a schematic diagram of a truck's wireless communication system employing a wireless communication link 300 in tandem with a controller 310, according to some exemplary embodiments of the present invention.

FIG. 3 is a schematic diagram of a truck's wireless communication system employing a wireless link 300 in tandem with a controller 310, according to some exemplary embodiments of the present invention.

The embodiments shown in FIG. 3 are substantially similar to those of FIG. 2, except that rather than control the auxiliary devices 230 directly, the trailer transceiver 304 communicates a control signal corresponding to the signal received from the tractor transceiver 302 to the controller 310, and the controller 310 controls the state (e.g., ON/OFF state) of each of the auxiliary devices 230 according to the control signal.

In some embodiments, the auxiliary devices 230 receive electrical power from the battery 220 (or the APU 240) through the controller 310, rather than directly from the battery 220 (or the APU 240). That is, the controller 310 receives electrical power from the battery 220 (or the APU 24), and routes that electrical power to any of the auxiliary devices 230 that are intended to be turned ON (e.g., as indicated by an operator of the vehicle, and communicated via the control signal to the controller 310), and disables current flow from the battery 220 (or the APU 24) to those auxiliary devices 230 that are intended to be OFF. Thus, each auxiliary device 230 or each string of serially-connected auxiliary devices 230 may have a separate current flow path to the controller 310.

According to some embodiments, the controller 310 further monitors the charge state of the battery 220 and generates a fault signal to send to the electrical system of the tractor 100 (via the wireless link 300) when the remaining charge in the battery 220 drops below a preset threshold (e.g., about 10.5 V). In some embodiments, the controller 310 may, continuously or at regular intervals, determine the remaining charge level of the battery 220 and communicate the determined charge level to the ECU 120 at the tractor (e.g., to display at the user interface console 130).

As illustrated in FIG. 3, the controller 310 may be external to the trailer transceiver 304; however, embodiments of the present invention are not limited thereto and the controller 310 may be integrated with, and be a part of, the trailer transceiver 304.

Figure 4:
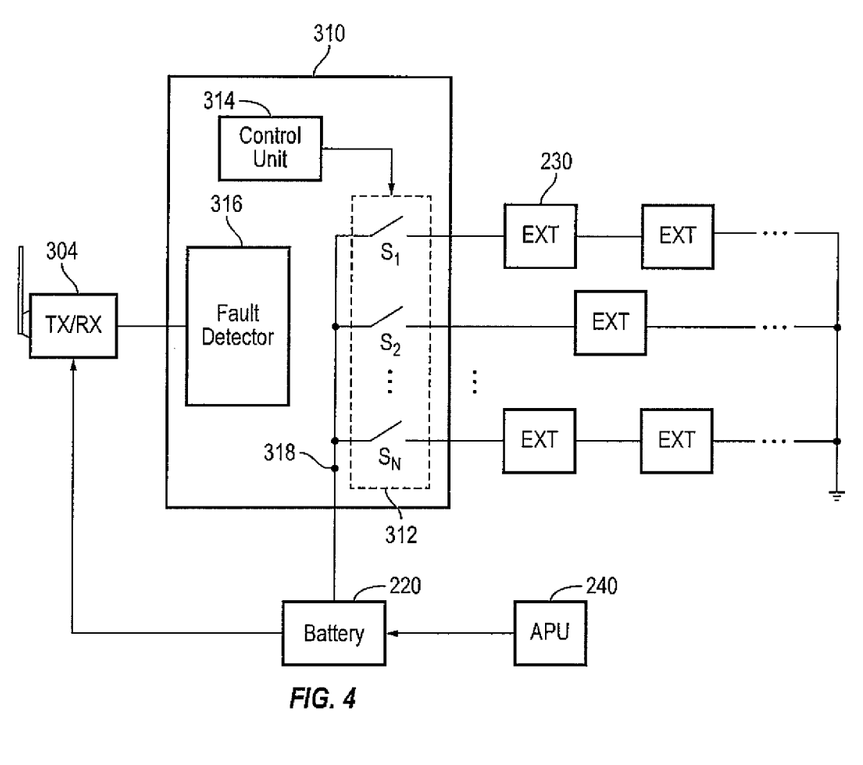
FIG. 4 is a schematic diagram of an electrical circuit of a trailer including a controller, according to some exemplary embodiments of the present invention.

FIG. 4 is a schematic diagram of an electrical circuit of a trailer 200 including a controller 310, according to some embodiments of the present invention.

In some embodiments, the controller 310 includes a switching network 312 for coupling the battery 220 to the auxiliary devices 230, a control module 314 for controlling the switching network 312 according to a control signal from the trailer transceiver 304, and a fault detector 316 for detecting a charge condition of the battery 220.

In some embodiments, the switching network 312 comprises a plurality of switches $S_1$ to $S_N$ (where N is a positive integer) configured to electrically couple the auxiliary devices 230 to the battery 220 when activated (e.g., turned ON or closed). The control module 314 determines which of the plurality of switches $S_1$ to $S_N$ to activate and which to deactivate (e.g., turned OFF or opened) based on the control signal from the trailer transceiver 304. In some examples, the plurality of switches $S_1$ to $S_N$ may include one or more MOSFETs (e.g., PMOS and/or NMOS transistors) and electromagnetic/electromechanical relays (e.g., a reed relay), and/or any other suitable switch as recognized by those of ordinary skill in the art. The plurality of switches $S_1$ to $S_N$ may be integrated with the other circuitry of the controller 310 or may be discrete components external to such circuitry.

According to some embodiments, the fault detector 316 includes a sensor configured to measure a voltage at the battery 220 (e.g., the voltage at line 318), and generates a fault signal when the measured voltage at the batter is below a preset threshold. The sensor may include a circuit utilizing an operation amplifier and a voltage divider or any other suitable circuit known to a person of ordinary skill for measuring voltage. In some examples, the threshold voltage may be adjustable by an operator or user and programmed into the controller 310 (e.g., through the ECU 120 and the wireless link 300). In some examples, the sensor may continuously (e.g., at regular intervals) monitor the voltage at the battery 220 and the controller 310 may communicate the monitored voltage to the ECU 120 to indicate remaining battery charge. Such a feature may also alert an operator of the vehicle of potential battery failure, for example, when the battery is indicated as having low to no charge even after a period of charging.

While this invention has been described in detail with particular references to exemplary embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. When an element or layer is referred to as being "directly on," "directly connected to", "directly coupled to", or "immediately adjacent to" another element or layer, there are no intervening elements or layers present.

As used herein, the terms "use," "using," and "used" may be considered synonymous with the terms "utilize," "utilizing," and "utilized," respectively.

The transceivers and the controller and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the transceivers and the controller may be formed on one integrated circuit (IC) chip or on separate IC chips. Further, the various components of the transceivers and the controller may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. An electrical communication link between a tractor and a trailer, the trailer comprising one or more auxiliary electrical devices, the electrical communication link comprising:
    a first transceiver coupled to the tractor and configured to receive a first signal from the tractor and to wirelessly transmit a control signal corresponding to the first signal; and
    a second transceiver coupled to the trailer and configured to wirelessly receive the control signal and to generate a second signal corresponding to the control signal for transmission to the one or more auxiliary devices; and
    a controller at the trailer and coupled between the second transceiver and the one or more auxiliary devices, the controller being configured to activate the one or more auxiliary devices based on the second signal generated by the controller,
    wherein the controller is further configured to detect a presence of an electrical-power-carrying harness coupled to junction boxes of the tractor and trailer, to determine that power supplied by the harness is sufficient to power the auxiliary devices that are activated, to supply electrical power to the second transceiver from the harness in response to the determinations, and to supply electrical power to the second transceiver from a battery of the trailer in response to determining that the harness is not present or that the power supplied by the harness is insufficient to power the auxiliary devices.

2. The electrical communication link of claim 1,
wherein the second transceiver is further configured to receive a third signal indicative of a state of the one or more auxiliary devices and to wirelessly transmit a feedback signal corresponding to the first signal, and
wherein the first transceiver is further configured to wirelessly receive the feedback signal and to transmit a fourth signal corresponding to the feedback signal to the tractor.

3. The electrical communication link of claim 2, wherein the feedback signal comprises diagnostic data indicative of a fault condition in the one or more auxiliary devices.

4. The electrical communication link of claim 1,
wherein the first transceiver is further configured to couple to a multi-pin socket of a tractor junction box, and
wherein the second transceiver is further configured to couple to a multi-pin socket of a trailer junction box.

5. The electrical communication link of claim 1, wherein the one or more auxiliary devices comprise at least one of a stop light, a turn signal, a brake light, a trailer exterior light, a trailer interior light, and an anti-lock braking system.

6. The electrical communication link of claim 1, wherein each of the second transceiver and the one or more auxiliary devices are configured to receive electrical power from the battery of the trailer.

7. The electrical communication link of claim 1, wherein the first and second transceivers are coupled to the junction boxes at the tractor and trailers, respectively.

8. An electrical system for communicating signals between a tractor and a trailer, the electrical system comprising:
a first transceiver coupled to the tractor and configured to receive a first signal from the tractor and to wirelessly transmit a control signal corresponding to the first signal;
a second transceiver coupled to the trailer and configured to wirelessly receive the control signal and to generate a second signal corresponding to the control signal for transmission to one or more auxiliary devices;
a battery coupled to the trailer and configured to power the second transceiver; and
a controller at the trailer and coupled between the second transceiver and the one or more auxiliary devices, the controller being configured to activate the one or more auxiliary devices based on the second signal generated by the controller,
wherein the controller is further configured to detect a presence of an electrical-power-carrying harness coupled to junction boxes of the tractor and trailer, to determine that power supplied by the harness is sufficient to power the auxiliary devices that are activated, to supply electrical power to the second transceiver from the harness in response to the determinations, and to supply electrical power to the second transceiver from the battery in response to determining that the harness is not present or that the power supplied by the harness is insufficient to power the auxiliary devices.

9. The electrical system of claim 8,
wherein the second transceiver is further configured to receive a third signal indicative of a state of the one or more auxiliary devices from the controller and to wirelessly transmit a feedback signal corresponding to the first signal, and
wherein the first transceiver is further configured to wirelessly receive the feedback signal and to transmit a fourth signal corresponding to the feedback signal to the tractor.

10. The electrical system of claim 8, wherein the controller comprises a switching network configured to couple the one or more auxiliary devices to the battery based on the second signal.

11. The electrical system of claim 8, wherein the controller comprises a sensor configured to monitor a voltage of the battery.

12. The electrical system of claim 11, wherein the controller is configured to generate a fault signal when the voltage of the battery is below a threshold.

13. The electrical system of claim 12, wherein the first and second transceivers are configured to transmit the fault signal to the tractor.

* * * * *

UNITED STATES PATENT AND TRADEMARK OFFICE
CERTIFICATE OF CORRECTION

PATENT NO. : 9,834,133 B2
APPLICATION NO. : 14/809145
DATED : December 5, 2017
INVENTOR(S) : Adam Bean Page 1 of 1

It is certified that error appears in the above-identified patent and that said Letters Patent is hereby corrected as shown below:

On the Title Page (73) Assignee: Please delete "R.A. PHILLIPS INDUSTRIES, INC." and insert -- PHILLIPS CONNECT TECHNOLOGIES LLC --

Signed and Sealed this
First Day of January, 2019

Andrei Iancu
*Director of the United States Patent and Trademark Office*